United States Patent [19]
Hansen et al.

[11] Patent Number: 5,816,795
[45] Date of Patent: Oct. 6, 1998

[54] APPARATUS AND METHOD FOR PROVIDING SUPPLEMENTAL FUEL TO A PREHEATER/PRECALCINER KILN

[75] Inventors: Eric R. Hansen, Shawnee, Kans.; Theodore J. Reese, Ft. Myers, Fla.; James R. Tutt, Nash, Tex.

[73] Assignees: Cadence Environmental Energy, Inc., Michigan City, Ind.; Ash Grove Cement Company, Overland Park, Kans.

[21] Appl. No.: 653,244

[22] Filed: May 24, 1996

[51] Int. Cl.⁶ .................................................. F27B 15/00
[52] U.S. Cl. .......................... 432/14; 432/106; 110/246; 110/346
[58] Field of Search .................. 432/14, 106; 110/246, 110/346

[56] References Cited

U.S. PATENT DOCUMENTS

| | | |
|---|---|---|
| Re. 31,046 | 10/1982 | Lombana et al. . |
| 3,507,482 | 4/1970 | Kraszewski et al. . |
| 3,572,524 | 3/1971 | Muckenheim . |
| 3,916,806 | 11/1975 | Giraud . |
| 3,925,091 | 12/1975 | Yoshida et al. . |
| 4,025,295 | 5/1977 | Touborg .................................. 432/14 |
| 4,078,882 | 3/1978 | Houd ...................................... 432/106 |
| 4,081,285 | 3/1978 | Pennell . |
| 4,110,121 | 8/1978 | Rechmeier et al. . |
| 4,118,176 | 10/1978 | Mollenkopf et al. ...................... 432/14 |
| 4,120,645 | 10/1978 | Heian et al. .............................. 432/14 |
| 4,126,471 | 11/1978 | Herchenbach et al. . |
| 4,238,237 | 12/1980 | Jarrett et al. . |
| 4,256,503 | 3/1981 | Tsuda et al. . |
| 4,286,993 | 9/1981 | Lovichi et al. . |
| 4,295,823 | 10/1981 | Ogawa et al. . |
| 4,329,180 | 5/1982 | Herchenbach et al. . |
| 4,372,784 | 2/1983 | Hess . |
| 4,374,704 | 2/1983 | Young . |
| 4,419,943 | 12/1983 | Faurholdt . |
| 4,452,154 | 6/1984 | Kono et al. . |
| 4,466,361 | 8/1984 | Henery et al. . |
| 4,496,313 | 1/1985 | Quittkat et al. ........................ 432/106 |
| 4,551,051 | 11/1985 | Hofbauer et al. . |
| 4,640,203 | 2/1987 | Wolter et al. . |
| 4,640,681 | 2/1987 | Steinbiss et al. . |
| 4,650,546 | 3/1987 | Le Jeune ................................ 110/223 |
| 4,678,514 | 7/1987 | Deyhle et al. . |
| 4,745,869 | 5/1988 | Dilmore et al. ........................ 110/246 |
| 4,746,290 | 5/1988 | DeCicco et al. . |
| 4,750,437 | 6/1988 | Rouse . |
| 4,751,887 | 6/1988 | Terry et al. . |
| 4,766,822 | 8/1988 | DeCicco et al. . |
| 4,785,745 | 11/1988 | Hanni et al. . |
| 4,793,269 | 12/1988 | Dezubay et al. . |
| 4,840,130 | 6/1989 | Quiel ...................................... 110/246 |

(List continued on next page.)

FOREIGN PATENT DOCUMENTS

WO 82/01581  5/1982  WIPO .

OTHER PUBLICATIONS

ZKG International No. Apr. 1983, pp. 185–189, by R. Naredi (translation and original language) "Using Solid Fuels in Supplementary Firing of Rotary Cement Kilns"–Einsatz fester Brennstoffe bei Zusatzfeuerung von Zementdrehofen.

"Waste Fuel Survey Report", Rock Products, Apr., 1985, pp. 40–43, Huhta, Richard S.

"Cement–Data–Book," 1976 Bauverlag GMBH Wiesbaden and Berlin, Cover Page and pp. 329–336.

*Primary Examiner*—Teresa J. Walberg
*Assistant Examiner*—Jiping Lu
*Attorney, Agent, or Firm*—Barnes & Thornburg

[57] ABSTRACT

A preheater or precalciner kiln is modified to feed solid fuel into a riser duct of the kiln to enable efficient environmentally sound use of solid waste-derived fuel. The modified kiln includes a solid fuel delivery port in the riser duct, a fuel feeder device for feeding solid fuel through the delivery port, and a fuel suspension device for holding the solid fuel for combustion in a fixed position in the kiln gas stream.

64 Claims, 5 Drawing Sheets

U.S. PATENT DOCUMENTS

| | | |
|---|---|---|
| 4,850,290 | 7/1989 | Benoit et al. . |
| 4,905,614 | 3/1990 | Grigel et al. . |
| 4,930,965 | 6/1990 | Peterson et al. . |
| 4,969,407 | 11/1990 | Benoit et al. . |
| 4,974,529 | 12/1990 | Benoit et al. . |
| 4,976,210 | 12/1990 | Dewald . |
| 4,984,983 | 1/1991 | Enkegaard . |
| 5,058,513 | 10/1991 | Benoit et al. . |
| 5,070,797 | 12/1991 | Rietzscher et al. ............... 110/265 |
| 5,078,594 | 1/1992 | Tutt et al. . |
| 5,083,516 | 1/1992 | Benoit et al. . |
| 5,122,189 | 6/1992 | Garrett et al. . |
| 5,156,676 | 10/1992 | Garrett et al. . |
| 5,224,433 | 7/1993 | Benoit et al. . |
| 5,226,774 | 7/1993 | Tutt et al. . |
| 5,400,726 | 3/1995 | Dumons ................... 110/223 |
| 5,451,255 | 9/1995 | Hansen et al. . |
| 5,454,715 | 10/1995 | Hansen et al. . |
| 5,544,597 | 8/1996 | Camacho ................ 110/223 |

APPARATUS AND METHOD FOR PROVIDING SUPPLEMENTAL FUEL TO A PREHEATER/PRECALCINER KILN

FIELD OF THE INVENTION

The present invention relates to use of solid wastes in preheater/precalciner kilns. More particularly, this invention is directed to an apparatus and method for feeding combustible solid waste into the riser duct of a preheater or precalciner kiln for combustion within the riser duct.

BACKGROUND AND SUMMARY OF THE INVENTION

Solid combustible wastes have always been generated by industry. Many of such wastes, because of their flammable or toxic character, are categorized by applicable environmental regulations as "hazardous wastes". Prior to governmental regulation of the disposal of such materials, they were disposed of in landfill operations with significant environmental consequences. With recently enacted environmental regulations imposing severe restrictions on landfill-type disposal of hazardous wastes, the only viable means for their safe disposal has been by thermal treatment, typically at high cost in specialized hazardous waste incinerators equipped with extensive emission control devices.

Cement kilns have received favorable review from both federal and state environmental regulatory agencies as providing ideal conditions for disposal of combustible waste materials. The production of cement clinker in a cement kiln is an energy intensive operation. The use of combustible waste-derived fuel in a cement kiln provides inexpensive energy values for the cement making process with concomitant saving of non-renewable fuel sources. Thus, burning solid waste in operating kilns allows recovery of energy values from hazardous wastes. Also, because of high kiln operating temperatures, long residence times and their ability to provide favorable conditions for the chemical combination of inorganic residues into active compounds of portland cement, cement manufacturing operations provide ideal conditions for environmentally sound disposal of combustible both hazardous and non-hazardous combustible waste materials.

Cement clinker is produced by heating calcareous material with an argillaceous material or other forms of silica, alumina, and iron oxide which may additionally include minor amounts of materials indigenous to these raw materials at temperatures on the order of about 2300°–2900° F. to bring about the chemical reactions necessary to convert the ingredients to cement clinker. In conventional long wet or dry process kilns, calcining and clinkering of cement raw mineral materials are accomplished by passing finely divided raw mineral materials through a rotating inclined rotary vessel heated at its low end. Inasmuch as high temperatures are required for this process, fuel costs constitute a significant factor in the ultimate cost of the product. In particular, it is art recognized that the most significant factor in overall fuel costs for the production of cement clinker is the highly endothermic calcining step during which alkali metal carbonates are converted to their corresponding oxides with the concomitant generation of carbon dioxide. This portion of the cement manufacturing process accounts for over 70% of the theoretical energy requirements of a typical dry process.

Accordingly, methods of reducing fuel costs have been and still remain a major focus for the cement manufacturing industry. One development directed at realizing substantial fuel savings was the construction and use of precalciner kilns in which the finely divided raw material is suspended with burning fuel with high heat transfer efficiency. Precalciners utilize a special chamber, a riser duct, for combustion of up to 60% of the total process fuel in suspension with preheated raw mineral materials from a conventional suspension preheater system to rapidly (typically 1–2 seconds) calcine about 90% of the calcium carbonate in the raw mineral feed to calcium oxide.

The intimate contact between the suspended mineral particles and the burning fuel, result in excellent thermal efficiency and substantial fuel savings (among other benefits) as compared to the conventional long wet or dry rotary kilns. See, Garrett, Rock Products, "Precalciners Today-A Review", pp. 39 et seq., July, 1985, for a detailed description of precalciners.

Another type of cement kiln developed with view of energy savings is a preheater kiln. Preheater kilns are also constructed with a riser duct and typically a multistage cyclone system in which the raw mineral materials are suspended in the hot kiln gas stream generated by the burner providing heat for the clinker portion of the process. Unlike the precalciner configuration, no additional fuel is combusted in the riser duct of a preheater kiln and as a consequence of the lower temperatures the raw mineral material is typically not heated to calcining temperatures. However, because the raw mineral material is efficiency heated in the kiln gas stream before it enters the rotary vessel portion of the kiln, the required length of the rotary vessel portion of the kiln (and thus the residence time of the mineral in the rotary vessel) is substantially reduced.

It is known to charge solid waste into the rotary vessel of a cement kiln for environmentally sound recovery and use of energy values from such waste products. See U.S. Pat. No. 4,850,290 to Benoit et al. It is also known to charge the solid waste, for example, containerized waste or whole tires into a shelf-transition portion of a precalciner or preheater cement kiln. See U.S. Pat. No. 4,850,290 to Benoit et al. The shelf-transition portion is located between the riser duct and rotary vessel. In a precalciner, feeding solid waste-derived fuel into the shelf-transition portion results in a savings of up to about 10% of the process fuel.

One object of this invention is to provide a safe, environmentally acceptable apparatus and method for disposal of combustible solid hazardous waste materials, including hazardous waste solids. It is another object of this invention to provide an apparatus and method of recovering energy values of solid combustible hazardous waste materials and of using such materials to provide up to 20% or more of the energy requirements of preheater or precalciner kiln operation. The apparatus and method can be utilized to optimize compliance with applicable environmental emission standards and they also enable a most efficient use of solid wastes as supplemental fuel in cement manufacturing without compromising quality of the processed mineral product.

According to the present invention, a preheater or precalciner kiln is modified to feed solid fuel into the riser duct for burning in a kiln gas stream flowing serially through the rotary vessel, the shelf-transition portion, and the riser duct. A solid fuel delivery port is formed in the riser duct at a point downstream relative to kiln gas flow of the shelf-transition portion. A fuel delivery tube extends through the fuel delivery port and includes a fuel inlet end external of the riser duct and a fuel outlet end internal of the riser duct. A grate is positioned to receive and suspend solid fuel exiting the output end of the fuel delivery tube in the riser duct. A solid fuel feed mechanism is used to feed fuel into the fuel inlet end of the fuel delivery tube and onto the grate.

The fuel delivery tube includes an intermediate staging portion between the fuel inlet end and the fuel outlet end. The staging portion and the outlet end portion of the fuel delivery tube are preferably insulated. In one embodiment, insulation is provided by an annular passageway for delivery of oxygen-containing gas to contact solid fuel suspended in the kiln gas stream on the grate. A combustion control agent can be metered into the intermediate staging portion to contact solid waste "staged" for delivery onto the grate in the riser duct. A valve moveable between a delivery tube-opened and a delivery tube-closed position is preferably located in the delivery tube between the intermediate staging portion and the fuel inlet end. Combustion of the solid waste can be monitored in the riser duct and controlled by adjusting contact of the waste solids with oxygen-containing gas and a combination control agent.

Additional features and advantages of the invention will become apparent to those skilled in the art upon consideration of the following detailed description of the preferred embodiments exemplifying the best mode of carrying out the invention.

DETAILED DESCRIPTION OF THE PREFERRED EMBODIMENT

This invention relates to a method for achieving environmentally sound disposal of combustible solid waste in an operating preheater or precalciner cement kiln. In the widely used commercial process for the production of cement clinker, cement raw materials are calcined and "clinkered" by passing finely divided raw mineral materials through a rotating inclined rotary kiln vessel or kiln cylinder. The requisite temperatures for processing the mineral material are achieved by burning fuel such as gas, fuel oil, powdered coal and the like at the lower end of the kiln with the kiln gases moving countercurrent to the mineral materials moving through the rotating kiln cylinder.

Preheater or precalciner kilns have, in addition to the inclined rotating kiln vessel fired at its lower end and a stationary heat transfer portion at its upper end, typically including multistage cyclones, for preheating or precalcining the mineral material before it is introduced into the upper end of the rotating kiln cylinder. Because the mineral material is preheated or precalcined before entering the rotating kiln vessel, the length of the rotating kiln vessel can be much shorter than the kiln vessel in conventional long kilns not having a preheater or precalciner. The present invention provides a method and apparatus for controlled environmentally sound, highly efficient burning of solid combustible wastes as supplemental fuel in the stationary heat transfer portion of preheater or precalciner kilns.

Figure 1:
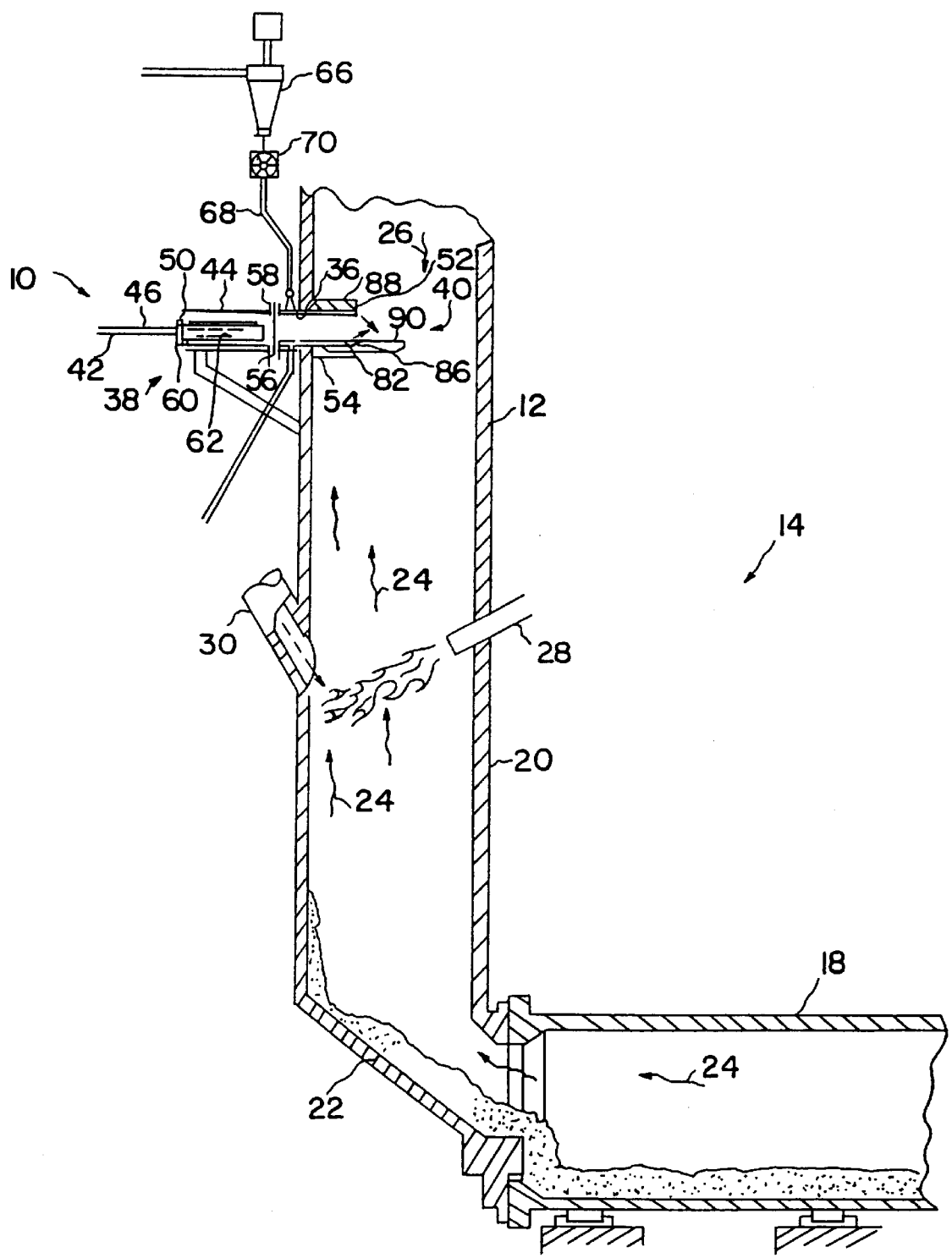
FIG. 1 is a partial cross-sectional view of a precalciner kiln modified to accept the fuel charging apparatus of the present invention on the riser duct.
Figure 2:
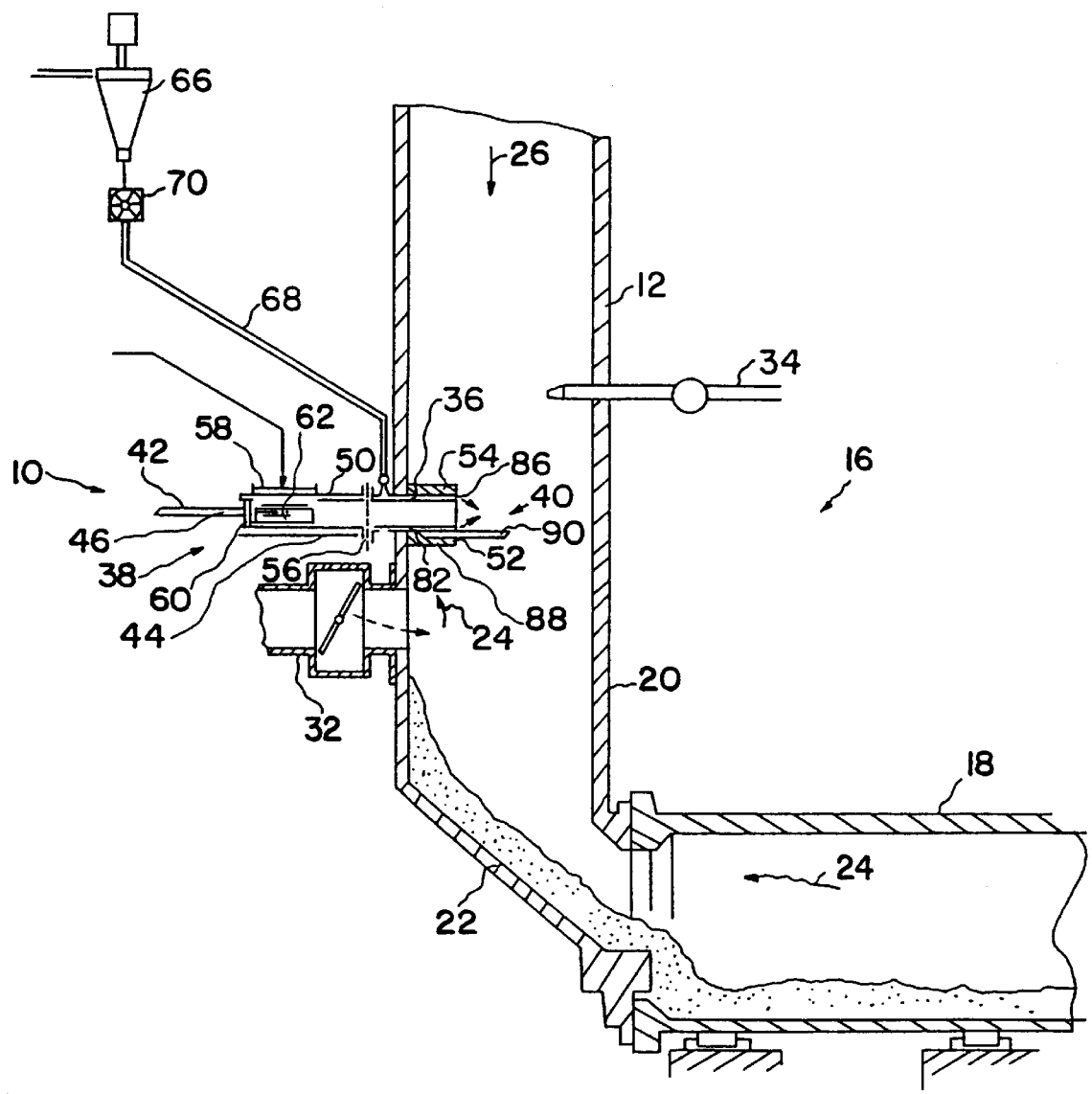
FIG. 2 is a partial cross-sectional view of a preheater kiln modified to accept the fuel charging apparatus of the present invention on the riser duct.

In the present invention a fuel charging apparatus 10 is provided to charge combustible waste solids into a riser duct 12 of a precalciner or preheater kiln 14, 16 as shown in FIGS. 1 and 2. Precalciner and preheater kilns 14, 16 include a rotary vessel 18, riser duct 12, and a shelf-transition portion 22 situated between rotary vessel 18 and riser duct 12. Kiln gas flows serially in direction 24 through rotary vessel 18, shelf-transition portion 22, and riser duct 12. Mineral material flows in direction 26 countercurrent to the kiln gas stream. The mineral material falls through riser duct 12 onto shelf-transition portion 22 and then into and through rotary vessel 18. The heated kiln gas stream flowing upwardly through riser duct 12 in direction 24 heats the mineral material as it falls down through riser duct 12 and in serial cyclones (not shown) downstream relative to kiln gas flow, of the riser duct 12. The mineral material is finely crushed to permit good heat transfer between the heated kiln gas stream and the mineral material.

Precalciner kiln 14 is shown in FIG. 1 and preheater kiln 16 is shown in FIG. 2. The difference between precalciner kiln 14 and preheater kiln 16 is that a significant portion of the fuel for the cement manufacturing process is combusted within riser duct 12 of precalciner kiln 14 to provide higher temperatures and additional heating of the mineral material falling through riser duct 12 of precalciner kiln 14. The mineral material falling through riser duct 12 of preheater kiln 16 is heated only by the kiln gas stream flowing from the rotary vessel 18 while the mineral material falling through precalciner kiln 14 is heated by the kiln gas stream and the extra heat energy (and consequent higher temperatures) from combustion of the fuel in riser duct 12 so that the mineral material is substantially precalcined before reaching shelf-transition portion 22.

Precalciner kiln 14 includes a supplemental process fuel inlet 28 and an oxygen-containing gas inlet 30 on riser duct 12 as shown in FIG. 1. Oxygen-containing gas inlet 30 is situated adjacent to supplemental process fuel inlet 28 to provide oxygen-containing gas, typically ambient or preheated air, adjacent to supplemental process fuel inlet 28 to promote combustion of the supplemental process fuel flowing through supplemental process fuel inlet 28 into riser duct 12. As described above, combustion of the supplemental process fuel provides additional heating of the mineral material falling through riser duct 12 of precalciner kiln 14 so that the mineral material is substantially precalcined before reaching shelf-transition portion 22. Supplemental process fuel inlet 28 and oxygen-containing gas inlet 30 are standard items on all precalciner kilns 14.

Modified kiln 16 includes a ambient air inlet 32 and an optional oxygen inlet 34 on riser duct 12 as shown in FIG. 2. These inlets 32, 34 are not standard items on preheater kilns 16 and are added to preheater kiln 16 when riser duct 12 of preheater kiln 16 is modified to add fuel charging apparatus 10. The inlets 32, 34 are added to riser duct 12 of preheater kiln 16 to provide an oxygen-containing gas within riser duct 12 to promote the combustion of the combustible solid waste. The introduction of oxygen-containing gas also promotes mixing of volatiles from the pyrolyzed fuel to promote combustion. Only one of inlets 32, 34 is required to provide the necessary oxygen to support combustion of the combustible solid waste. In alternative embodiments, one inlet into riser duct may be provided for the introduction of both oxygen and ambient air. It is, of course, possible to introduce the required additional oxygen through the primary burner (not shown) of rotary vessel 18, however, adding excess oxygen at this location has the adverse effect of cooling the flame of the primary burner (not shown).

Use of fuel charging apparatus 10 in precalciner kiln 14 to burn combustible solids in the riser duct 12 allows significant standard reduction of the amount of fuel needed to supply the energy requirements of the precalciner kiln 14. Additionally, fuel charging apparatus 10 can be installed in the riser duct 12 of preheater kiln 16 to supply supplemental heat energy to the preheater kiln 16 at a point in the process where excess heat generated by the burning supplemental solid waste-derived fuel can actually work to initiate calcination of the mineral as it passes through the riser duct 12 before reaching the shelf-transition portion 22. This configuration in the riser duct 12 optimizes efficiency and transfer of heat energy to the mineral material.

Figure 3:
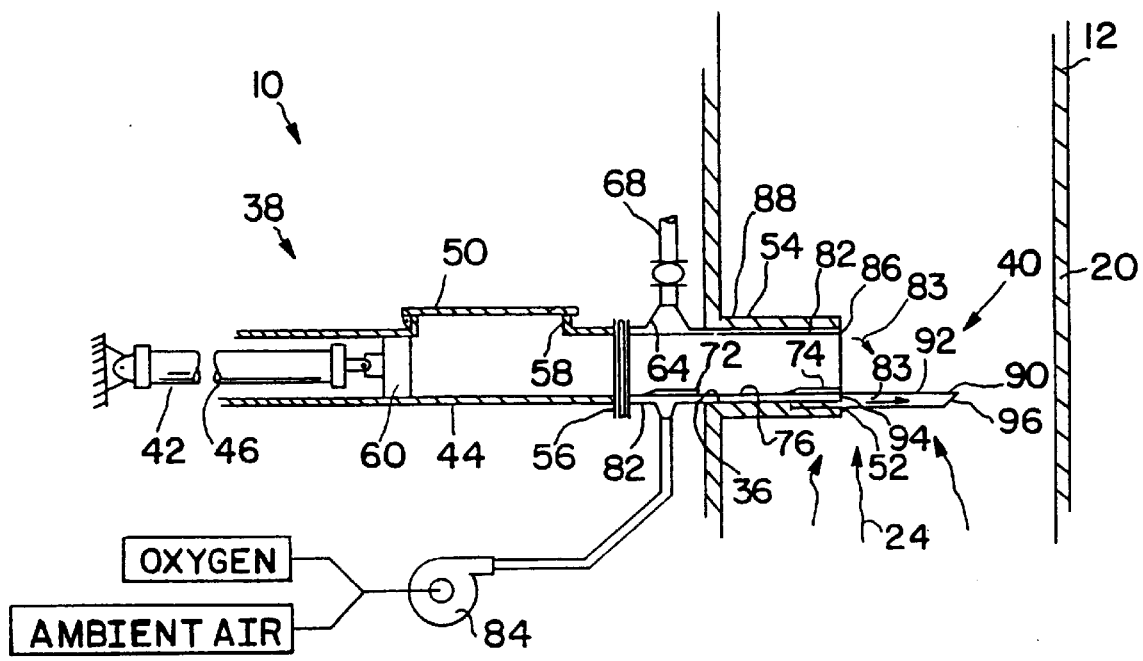
FIG. 3 is an enlarged sectional view of the fuel charging apparatus of FIGS. 1 and 2.

Fuel charging apparatus 10 is shown in more detail in FIG. 3. Riser duct 12 is formed to include a solid fuel delivery port 36 through which fuel charging apparatus 10 extends substantially perpendicular to riser duct 12. Fuel charging apparatus 10 is spaced apart from shelf-transition portion 22 at a point downstream relative to the kiln gas flow from shelf-transition portion 22. In preferred embodiments, fuel charging apparatus 10 extends into riser duct 12 at a location where the kiln gas stream is at a temperature of 1800°–2000° F. In the illustrated embodiment, riser duct 12 has a diameter of approximately 10–12 feet (3–3.7 meters) and includes a circular riser duct wall 20 made of steel and ceramic insulating material (fire brick). In preferred embodiments of precalciner kiln 14, fuel charging apparatus 10 is situated close to supplemental process fuel inlet 28 and oxygen-containing gas inlet 30 to permit the optimum use of the combustible solid waste as shown in FIG. 1. In the illustrated embodiment, fuel charging apparatus 10 is situated approximately 25–30 feet (7.6–9.1 meters) above shelf-transition portion 22. A conventional elevator or conveyance device (not shown) is used to transport the combustible solid waste up to fuel charging apparatus 10.

Figure 5:
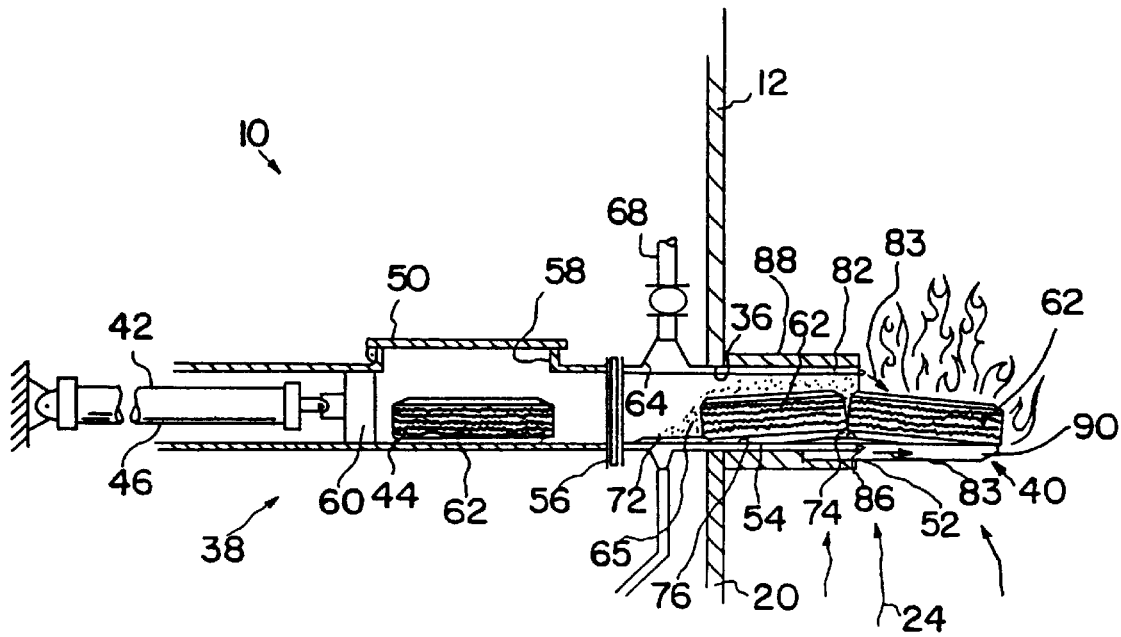
FIG. 5 and 6 are sectional views similar to FIG. 3 showing tires being fed into the riser duct of the kiln to be combusted in the riser duct.
Figure 6:
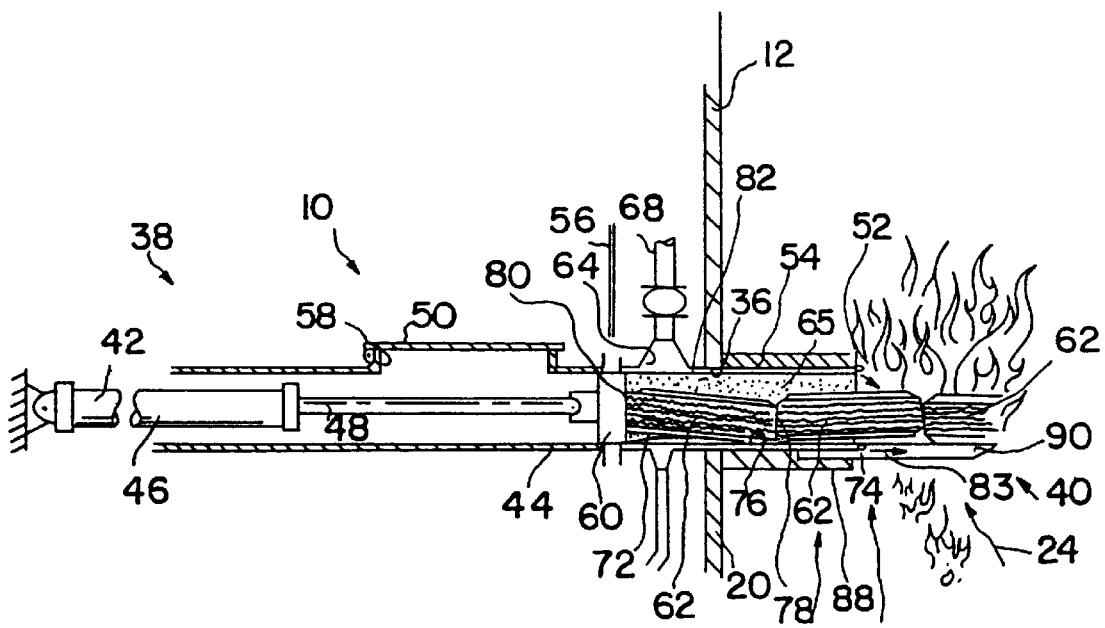

Fuel charging apparatus 10 includes a fuel feeder 38 for feeding the combustible solid waste into riser duct 12 and a fuel suspension device 40 situated in riser duct 12 to receive the combustible solid waste from fuel feeder 38 and suspend the combustible solid waste in the kiln gas stream flowing upwardly in direction 24 through riser duct 12. The fuel feeder 38 includes a solid fuel feed mechanism 42 and a fuel delivery tube 44. In the illustrated embodiment, solid fuel feed mechanism 42 is a reciprocable hydraulic ram 46 that reciprocates along a fuel delivery path 48 as shown in FIGS. 3, 5, and 6. In alternative embodiments of the present invention, other types of solid fuel feed mechanisms may be used such as an auger or conveyer belt.

Fuel delivery tube 44 includes a fuel inlet end 50 situated adjacent to solid fuel feed mechanism 42, a fuel outlet end 52 situated adjacent to fuel suspension device 40, and an intermediate staging portion 54 situated between fuel inlet end 50 and fuel outlet end 52. A gate valve 56 is located between fuel inlet end 50 and fuel outlet end 52 and movable between a delivery tube-opened and a delivery tube-closed position. Combustible solid hazardous waste in the form of a solid fuel module 62 enters a fuel-receiving port 58 formed in fuel inlet end 50 of fuel delivery tube 44 so that solid fuel module 62, for example a whole tire or packaged or compressed waste solids, is situated adjacent to a head portion 60 of reciprocable ram 46 as shown in FIG. 5. Reciprocable ram 46 moves between a retracted position to receive a solid fuel module 62, as shown in FIG. 5, and an extended position to move solid fuel modules 62 through fuel delivery tube 44. Reciprocable ram 46 is shown moving from its retracted position toward its extended position in FIG. 6. Solid fuel module 62 is moved from fuel inlet end 50 into intermediate staging portion 54 when gate valve 56 opens and reciprocable ram 46 moves from its retracted position toward its extended position to push solid fuel module 62 into intermediate staging portion 54 as shown in FIG. 6.

Intermediate staging portion 54 includes a combustion control agent receiving aperture 64 through which a combustion control agent 65 is permitted to pass to contact or cover solid fuel module 62 as shown in FIGS. 5 and 6. A combustion control agent cyclone collector 66 stores combustion control agent 65 and a combustion control agent feed line 68 connects cyclone collector 66 to intermediate staging portion 54 of fuel delivery tube 44 as shown in FIGS. 1 and 2. A valve 70 is situated in feed line 68 so that the amount of combustion control agent 65 entering intermediate staging portion 54 can be metered. In the illustrated embodiment, valve 70 is a remotely controlled variable speed rotary airlock valve. In alternative embodiments, a surge bin may be placed between the cyclone collector and the fuel charging apparatus.

Valve 70 permits combustion control agent 65 to pass through combustion control agent receiving aperture 64 into intermediate staging portion 54 at a selected rate at selected intervals of time. Valve 70 opens to permit combustion control agent 65 to flow into intermediate staging portion 54 to occupy any space not occupied by solid fuel module 62 when valve 56 opens to permit reciprocable ram 46 to push solid fuel modules 62 through fuel delivery tube 44. Valve 70 closes when reciprocable ram 46 extends to the position shown in FIG. 6 adjacent to combustion control agent receiving aperture 64 so that combustion control agent 65 does not fall between head portion 60 of reciprocable ram 46 and fuel inlet end 50.

Combustion control agent 65 may be cement kiln dust, raw mineral material, or a mixture thereof. Cement kiln dust is a by-product of the cement making process and is generally considered to be a waste product. Using cement kiln dust as combustion control agent 65 converts a waste product into a useful commodity for the destruction of solid fuel modules 12.

Combustion control agent 65 provides several functions. First, combustion control agent 65 provides an oxygen masking function to delay the combustion of solid fuel module 62 until solid fuel module 62 is moved out of fuel delivery tube 44 and onto fuel suspension device 40 as shown in FIGS. 5 and 6. Second, combustion control agent 65 provides an insulating function to reduce the amount of heat entering fuel delivery tube 44 from riser duct 12. Combustion control agent 44 and solid fuel module 62 form a "material plug" that separates the combustion process from intermediate staging portion 54 and solid fuel feed mechanism 42 as shown in FIGS. 5 and 6. Third, combustion control agent 65 acts as a lubricant to assist solid fuel module 62 in moving through fuel delivery tube 44. Due to the high temperature of the kiln gas stream passing through riser duct 12, solid fuel modules 62 are subject to being partially heat decomposed or melted to produce by-products which stick to fuel delivery tube 44. Combustion control agent 65 acts as a flux to assist solid fuel modules 62 in moving through fuel delivery tube 44. Fourth, combustion control agent 65 performs a safety function in the case of a backfire from riser duct 12 into fuel delivery tube 44.

The intermediate staging portion 54 includes a first set of rails 72 located adjacent to valve 56 and a second set of rails 74 located adjacent to fuel outlet end 52 of fuel delivery tube 44 as shown in FIGS. 3, 5, and 6. Rails 72, 74 assist solid fuel module 62 in moving through intermediate staging portion 54. Combustion control agent 65 lies between rails 72, 74 and acts as a flux to provide a low friction surface for solid fuel modules 62 to pass over when moving through intermediate staging portion 54.

The high temperatures in intermediate staging portion 54 may cause solid fuel modules 62 to stick to head portion 60 of reciprocable ram 46. Thus, when reciprocable ram 46 moves from its extended position to its retracted position, shown in FIG. 5, solid fuel module 62 may be pulled back toward fuel inlet end 50 of fuel delivery tube 44 if it is stuck to head portion 60 of reciprocable ram 46. A fuel module catch gap 76 is provided between first and second set of rails 72, 74 as shown in FIGS. 3, 5, and 6. The position of fuel module catch gap 76 within intermediate staging portion 54 is selected so that when reciprocable ram 46 is fully extended, a first end 78 of solid fuel module 62 falls into catch gap 76 as shown in FIG. 6. When first end 78 of solid fuel module 62 falls into catch gap 76, a second end 80 of solid fuel module 62 substantially breaks contact with head portion 60 of reciprocable ram 46 and permits reciprocable ram 46 to move back to its retracted position without pulling solid fuel module 62 back toward fuel inlet end 50 of fuel delivery tube 44.

An annular passageway 82 surrounds intermediate staging portion 54 and extends between valve 56 and fuel outlet end 52 of fuel delivery tube 44 as shown in FIGS. 3, 5, and 6. A fan or blower 84 supplies an oxygen-containing gas such as ambient air and/or oxygen to passageway 82. Annular passageway 82 terminates in nozzles 86 which direct the oxygen-containing gas in direction 83 toward fuel suspension device 40 to contact the solid fuel module 62 located on suspension device 40 with oxygen-containing gas as shown in FIGS. 3–6. Passageway 82 may be of any cross-sectional shape.

Passageway 82 provides two functions. First, passageway 82 insulates intermediate staging portion 54. Second, the flow of oxygen-containing gas through passageway 82 and out of nozzle 86 toward fuel suspension device 40 provides supplemental oxygen for the combustion of solid fuel module 62 situated on fuel suspension device 40.

The section of intermediate staging portion 54 within riser duct 12 is insulated with a castable ceramic 88 such as fire brick. Passageway 82 is situated between intermediate staging portion 54 and castable ceramic 88 as shown in FIGS. 3–6.

Figure 4:
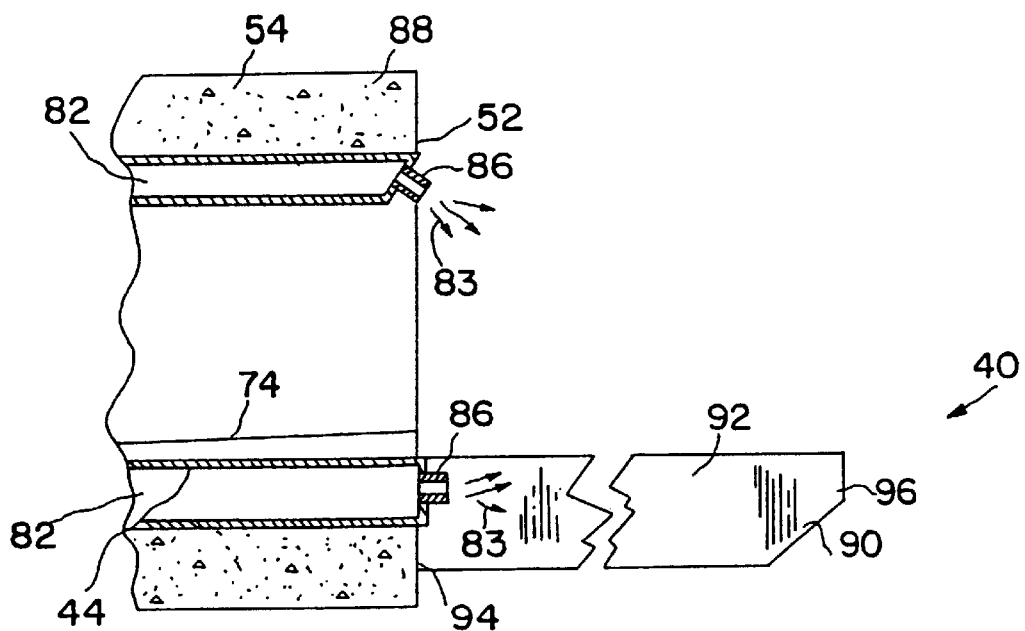
FIG. 4 is an enlarged sectional view of a portion of the fuel charging apparatus.

Fuel suspension device 40 includes a grate 90 which extends from fuel outlet end 52 of fuel delivery tube 44. Grate 90 receives solid fuel modules 62 from fuel delivery tube 44 and suspends solid fuel modules 62 in the kiln gas stream flowing upwardly through riser duct 12 while modules 62 are burning. Grate 90 includes a plurality of spaced-apart fingers 92 having a first end 94 appended to fuel delivery tube 44 and a second end 96 spaced apart from first end 94 as shown in FIGS. 3 and 4. The spaces between fingers 92 allow the kiln gas stream to low through grate 90 and contact solid fuel module 62 situated on grate 90 as shown in FIGS. 5 and 6. The spaces between fingers 92 reduce the resistance that grate 90 presents to kiln gas stream and thus reduces the pressure drop of the kiln gas stream created by grate 90. The spaces between fingers 92 also allow combustion control agent 65 to fall off solid fuel module 62 between fingers 92 into riser duct 12. In preferred embodiments, grate 90 is made of an alloy sold by Duralloy Blaw-Knox under the trademark Super 22-H®.

Combustion of solid fuel module 62 is initiated when it reaches grate 90. Combustion control agent 65 falls off of solid fuel module 62 and through grate 90 or is blown off by the kiln gas stream or oxygen-containing gas injected through nozzles 86 once solid fuel module 62 reaches grate 90. The oxygen-containing gas flowing through passageway 82 and directed through nozzles 86 toward grate 90 in direction 83 provides oxygen to support the combustion process.

Solid fuel module 62 is at least partially combusted before it is displaced from grate 90 by the next fuel module 62 under the influence of hydraulic ram 46. Any uncombusted portion of solid fuel module 62 will fall onto shelf-transition portion 22 and completely combust on shelf-transition portion 22 or in rotary vessel 18.

In the illustrated embodiment, solid fuel module 62 is a tire. However, in alternative embodiments, the solid fuel may include one or more of tires, medical waste, refinery waste, municipal waste, or other solid waste comprising combustible components. The size and shape of the fuel delivery tube, type of solid fuel feed mechanism, and shape and location of a catch gap may be altered to compensate for different solid forms of fuel modules.

Figure 7:
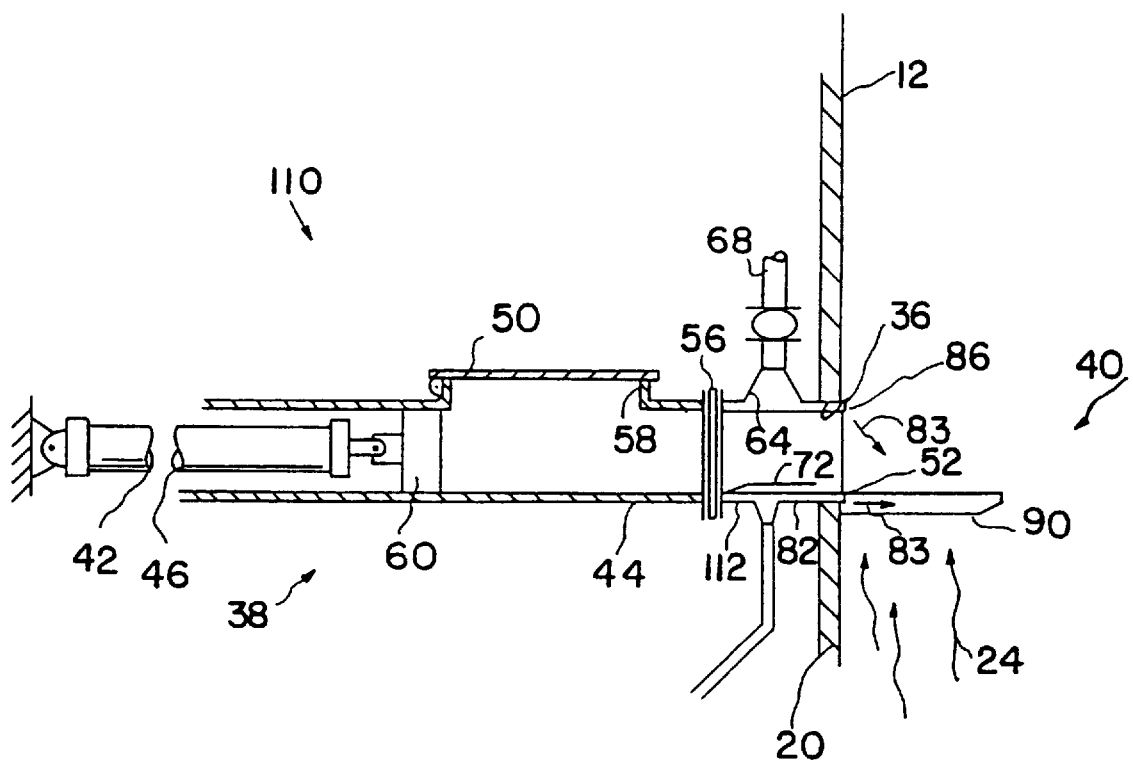
FIG. 7 is an enlarged sectional view similar to FIG. 3 showing an alternative embodiment of the fuel charging apparatus.

Another preferred embodiment of the present invention is shown as fuel charging apparatus 110 in FIG. 7. Fuel charging apparatus 110 is identical to fuel charging apparatus 10 except that the intermediate staging portion 112 of fuel charging apparatus 110 does not extend into riser duct 12. Except for intermediate staging portion 54, 112, all of the components of fuel charging apparatus 10 and fuel charging apparatus 110 are identical and are identified by identical reference numbers.

In the illustrated embodiments of the invention, only one fuel charging apparatus 10, 110 is provided in riser duct 12. In alternative embodiments, multiple fuel charging apparatus 10, 110 may be situated in a riser duct to provide equal distribution of fuel in the riser duct for optimum fuel/oxygen mixing.

Although the invention has been described and defined in detail with reference to certain preferred embodiments, variations and modifications exist within the scope and spirit of the invention as described and claimed in the following claims.

What is claimed is:

1. A preheater or precalciner cement kiln including a rotary vessel, a riser duct for counterflow preheating of cement raw materials, and a shelf-transition portion between the riser duct and the rotary vessel for receiving preheated mineral from the riser duct and delivering same into the rotary vessel, said kiln modified to feed solid fuel into the riser duct for burning in a kiln gas stream flowing serially through the rotary vessel, the shelf-transition portion, and the riser duct, the kiln comprising a solid fuel delivery port in the riser duct at a point downstream relative to kiln gas flow of the shelf-transition portion, means for feeding solid fuel through the solid fuel delivery port into the riser duct, and means for suspending the solid fuel delivered through the solid fuel delivery port in a fixed position in the kiln gas stream so that the solid fuel is combusted on the suspending means.

2. The kiln of claim 1, wherein the feeding means include means for directing oxygen-containing gas from a source outside the kiln gas stream to contact the suspended solid fuel.

3. The kiln of claim 1, wherein the feeding means includes means for combining the solid fuel with a combustion control agent prior to its delivery through the solid fuel delivery port into the riser duct.

4. The kiln of claim 3, wherein the combustion control agent is cement raw material.

5. The kiln of claim 3, wherein the combustion control agent is cement kiln dust.

6. The kiln of claim 1, wherein the feeding means includes a passageway terminating in the riser duct adjacent to the suspending means and means for directing oxygen-containing gas from a source outside the kiln gas stream through the passageway into the riser duct toward the suspended solid fuel.

7. The kiln of claim 1, wherein the feeding means includes a fuel delivery tube having a fuel inlet end external of the riser duct, a fuel outlet end internal of the riser duct, and an intermediate staging portion between the fuel inlet end and the fuel outlet end and a solid fuel feed mechanism adjacent to the fuel inlet end of the riser duct.

8. The kiln of claim 7, wherein the feeding means further includes an annular passageway surrounding the intermediate staging portion of the fuel delivery tube and terminating in the riser duct adjacent to the suspending means.

9. The kiln of claim 7, wherein the feeding means further includes a valve for the fuel delivery tube located between the intermediate staging portion and the fuel inlet end of the fuel delivery tube and means for opening and closing said valve.

10. The kiln of claim 7, wherein the intermediate staging portion includes means for combining solid fuel in that portion with a combustion control agent.

11. The kiln of claim 10, wherein the combustion control agent is cement raw material.

12. The kiln of claim 10, wherein the combustion control agent is cement kiln dust.

13. Method of feeding supplemental solid fuel into a preheater/precalciner kiln having a riser duct, a rotary vessel, a shelf-transition portion, and a kiln gas stream comprising combustion products flowing serially from said rotary portion through said shelf-transition portion and riser duct, the method comprising the steps of forming a supplemental solid fuel delivery port in the riser duct, said supplemental solid fuel delivery port being spaced apart downstream relative to the kiln gas flow from the shelf-transition portion, delivering supplemental solid fuel through the supplemental solid fuel delivery port, and providing a grate to suspend the supplemental solid fuel in the kiln gas stream passing through the riser duct so that the supplemental solid fuel is combusted on the grate.

14. The method of claim 13, further comprising the step of injecting oxygen-containing gas from a source outside the kiln gas stream toward the suspended supplemental solid fuel to promote combustion of the supplemental solid fuel.

15. The method of claim 13, further providing the step of contacting the supplemental solid fuel with a combustion control agent before delivering the supplemental solid fuel into the riser duct.

16. The method of claim 13, further comprising the steps of providing a valve in the fuel delivery tube and means for moving said valve between a tube-opened and a tube-closed position.

17. The method of claim 13, further comprising the steps of suspending the supplemental solid fuel and then dropping the supplemental solid fuel toward the shelf-transition portion of the preheater/precalciner kiln.

18. A preheater or precalciner cement kiln including a rotary vessel, a riser duct for counterflow preheating of cement raw materials, and a shelf-transition portion between the riser duct and the rotary vessel for receiving preheated mineral from the riser duct and delivering same into the rotary vessel, said kiln modified to feed solid fuel into the riser duct for burning in a kiln gas stream flowing serially through the rotary vessel, the shelf-transition portion and the riser duct, the kiln comprising:

a solid fuel delivery port in the riser duct at a point downstream relative to kiln gas flow of the shelf-transition portion, a fuel delivery tube having a fuel inlet end external of the riser duct, a fuel outlet end spaced apart from the fuel inlet end and communicating with the solid fuel delivery port, and an intermediate staging portion between the fuel inlet end and fuel outlet end, a grate receiving and suspending solid fuel exiting the fuel outlet end of the fuel delivery tube in the riser duct in the kiln gas stream at a point downstream relative to kiln gas flow of the shelf-transition portion so that the solid fuel is combusted on the grate, and a solid fuel feed mechanism feeding solid fuel through the fuel delivery tube and onto the grate.

19. The kiln of claim 18, further comprising a valve located in the fuel delivery tube between the intermediate staging portion and the fuel inlet end of the fuel delivery tube.

20. The kiln of claim 18, wherein the intermediate staging portion includes means for combining solid fuel in that portion with a combustion control agent.

21. The kiln of claim 20, wherein the combustion control agent is cement raw material.

22. The kiln of claim 20, wherein the combustion control agent is cement kiln dust.

23. The kiln of claim 18, wherein the intermediate staging portion is insulated.

24. The kiln of claim 18, wherein the fuel delivery tube includes a passageway terminating in the riser duct adjacent to the grate and means for directing oxygen-containing gas from a source outside the kiln gas stream through the passageway into the riser duct toward the grate.

25. The kiln of claim 24, wherein the passageway is an annular passageway surrounding the intermediate staging portion.

26. The kiln of claim 18, wherein the solid fuel feed mechanism is a reciprocable ram.

27. The kiln of claim 26, wherein the ram moves along a fuel delivery path substantially perpendicular to the riser.

28. The kiln of claim 18, wherein the fuel delivery tube extends substantially perpendicular to the riser.

29. The kiln of claim 18, wherein the grate is coupled to the riser duct.

30. The kiln of claim 18, wherein the grate includes a first end coupled to the riser duct and a second end spaced apart from the riser duct.

31. The kiln of claim 18, wherein the grate is cantilevered from the riser duct.

32. The kiln of claim 18, wherein the grate includes a plurality of spaced apart fingers having a first end coupled to the riser duct and a second end spaced apart from the first end.

33. The kiln of claim 18, wherein the fuel delivery tube extends through the solid fuel delivery port.

34. An apparatus for feeding solid fuel elements into a riser duct of a preheater/precalciner kiln, the kiln including a rotary vessel, the riser duct, and a shelf-transition portion connecting the rotary vessel and the riser duct, said apparatus comprising a fuel delivery tube having a fuel inlet end external to the riser duct, a fuel outlet end spaced apart from the fuel inlet end and communicating with a solid fuel delivery port in the riser duct, and an intermediate staging portion between the fuel inlet end and fuel outlet end, a grate suspending solid fuel elements delivered into the riser duct through the fuel delivery tube so that the solid fuel elements are combusted on the grate, said grate located in the riser duct and spaced apart from the shelf-transition portion, and a solid fuel feed mechanism delivering solid fuel elements through the fuel delivery tube onto the grate.

35. The apparatus of claim 34, wherein the fuel delivery tube includes a passageway for directing an oxygen-containing gas from a source outside the kiln gas stream toward solid fuel elements suspended by the grate.

36. The apparatus of claim 34, wherein the fuel feed mechanism includes means for delivering a combustion control agent into the fuel delivery tube to contact fuel elements as they are delivered through the fuel delivery tube.

37. The apparatus of claim 36, wherein the delivery means delivers same to the intermediate staging portion of fuel delivery tube.

38. The apparatus of claim 34, wherein the grate is coupled to the riser duct.

39. The apparatus of claim 34, wherein the grate includes a first end coupled to the riser duct and a second end spaced apart from the riser duct.

40. The apparatus of claim 34, wherein the grate is cantilevered from the riser duct.

41. The apparatus of claim 34, wherein the grate includes a plurality of spaced apart fingers having a first end coupled to the riser duct and a second end spaced apart from the first end.

42. The kiln of claim 34, wherein the fuel delivery tube extends through the solid fuel delivery port.

43. An apparatus for feeding solid fuel elements into a preheater/precalciner kiln having a side wall, the kiln including a rotary vessel, a riser duct, and a shelf-transition portion connecting the rotary vessel and the riser duct, said apparatus comprising a fuel delivery tube having a fuel inlet end external to the preheater/precalciner kiln, a fuel outlet end spaced apart from the fuel inlet end and communicating with a solid fuel delivery port in the preheater/precalciner kiln, and an intermediate staging portion between the fuel inlet end and fuel outlet end, a grate suspending solid fuel elements delivered into the preheater/precalciner kiln through the fuel delivery tube so that the solid fuel elements are combusted on the grate, said grate being connected to the side wall of the preheater/precalciner kiln, and a solid fuel feed mechanism delivering solid fuel elements through the fuel delivery tube onto the grate.

44. The apparatus of claim 43, wherein the grate is positioned to lie adjacent to the solid fuel delivery port in the preheater/precalciner kiln.

45. The apparatus of claim 13, wherein the grate is connected to a side wall of the riser duct.

46. The apparatus of claim 43, wherein the grate is spaced apart from the shelf-transition portion.

47. The apparatus of claim 43, wherein the grate includes a plurality of spaced apart fingers having a first end connected to the preheater/precalciner and a second end spaced apart from the first end.

48. The apparatus of claim 43, wherein the grate is coupled to the riser duct.

49. The apparatus of claim 43, wherein the grate includes a first end coupled to the riser duct and a second end spaced apart from the riser duct.

50. The apparatus of claim 43, wherein the grate is cantilevered from the riser duct.

51. The kiln of claim 43, wherein the fuel delivery tube extends through the solid fuel delivery port.

52. An apparatus for feeding solid fuel elements into a preheater/precalciner kiln having a side wall, the kiln including a rotary vessel, a riser duct, a shelf-transition portion connecting the rotary vessel and the riser duct, said apparatus comprising a fuel delivery tube having a fuel inlet end external to the preheater/precalciner kiln, a fuel outlet end spaced apart from the fuel inlet end and communicating with a solid fuel delivery port in the side wall of the preheater/precalciner kiln, and an intermediate staging portion between the fuel inlet end and fuel outlet end, a reciprocable ram delivering solid fuel elements through the fuel delivery tube and solid fuel delivery port into the preheater/precalciner kiln, and a grate suspending solid fuel elements delivered into the preheater/precalciner kiln through the fuel delivery tube by the reciprocable ram so that the solid fuel elements are combusted on the grate.

53. The apparatus of claim 52, wherein the reciprocable ram moves along a fuel delivery path substantially perpendicular to the side wall of the preheater/precalciner kiln.

54. The apparatus of claim 52, wherein the grate is connected to a side wall of the preheater/precalciner kiln.

55. The kiln of claim 52, wherein the grate is coupled to the riser duct.

56. The kiln of claim 52, wherein the grate includes a first end coupled to the riser duct and a second end spaced apart from the riser duct.

57. The kiln of claim 52, wherein the grate is cantilevered from the riser duct.

58. The kiln of claim 52, wherein the grate includes a plurality of spaced apart fingers having a first end coupled to the riser duct and a second end spaced apart from the first end.

59. The kiln of claim 52, wherein the fuel delivery tube extends through the solid fuel delivery port.

60. An apparatus for feeding solid fuel elements into a preheater/precalciner kiln, the kiln including a rotary vessel, a riser duct, and a shelf-transition portion connecting the rotary vessel and the riser duct, the solid fuel element including spaced apart first and second ends, said apparatus comprising a fuel delivery tube having a fuel inlet end external to the preheater/precalciner kiln, a fuel outlet end spaced apart from the fuel inlet end and communicating with a solid fuel delivery port in a side wall of the preheater/precalciner kiln, a solid fuel feed mechanism positioned to lie adjacent to the fuel inlet end of the fuel delivery tube and configured to deliver solid fuel elements through the fuel delivery tube and solid fuel delivery port into the preheater/precalciner kiln, and a first set of rails connected to the fuel delivery tube and adapted to support a solid fuel element as it is delivered through the fuel delivery tube, the first set of rails having a first end facing toward the fuel inlet end of the fuel delivery tube and a second end facing toward the fuel outlet end of the fuel delivery tube.

61. The apparatus of claim 60, further comprising a second set of rails connected to the fuel delivery tube and adapted to support a solid fuel element as it is delivered through the fuel delivery tube, the second set of rails includes a first end facing toward the fuel inlet end of the fuel delivery tube and a second end facing toward fuel outlet end of the fuel delivery tube, and the first end of the second set of rails is spaced apart from the second end of the first set of rails to define a gap between the first set of rails and the second set of rails.

62. The apparatus of claim 61, wherein the solid fuel feed mechanism engages a first end of a solid fuel element as the solid fuel element is delivered through the fuel delivery tube and moves between a retracted position and an extended position as the solid fuel element is delivered through the fuel delivery tube, the first end of the solid fuel element is adapted to fall into the gap defined between the first and second sets of rails when the solid fuel feed mechanism is in the extended position so that the first end of the solid fuel feed element substantially breaks contact with the solid fuel feed mechanism.

63. The apparatus of claim 60, further comprising a combustion control agent feeder delivering a combustion control agent into the fuel delivery tube and the combustion control agent lies between the first set of rails.

64. The apparatus of claim 63, wherein the combustion control agents acts as a flux to provide a low friction surface for a solid fuel element as the solid fuel element is passing through the fuel delivery tube.

* * * * *